United States Patent [19]

Haus et al.

[11] Patent Number: 5,059,003

[45] Date of Patent: Oct. 22, 1991

[54] FAST OPTICAL SWITCH AND LIMITER USING QUANTUM SIZE EFFECT IN METAL GRAIN COMPOSITES

[75] Inventors: Joseph W. Haus, Schenectady; Nauzer Kalyaniwalla, Troy, both of N.Y.; Ramarao Inguva; Charles M. Bowden, both of Huntsville, Ala.

[73] Assignee: The United States of America as represented by the Secretary of the Army, Washington, D.C.

[21] Appl. No.: 392,866

[22] Filed: Aug. 7, 1989

[51] Int. Cl.$^5$ ............................................... G02F 1/01
[52] U.S. Cl. ................................................... 359/243
[58] Field of Search ............ 350/354, 356, 362, 96.15; 252/600; 307/425

[56] References Cited

U.S. PATENT DOCUMENTS 4,828,758 5/1989 Gillberg-LaForce et al. ...... 252/600
4,919,521 4/1990 Tada et al. .......................... 350/362

OTHER PUBLICATIONS

"Optical Nonlinearities of Small Metal Particles: Surface-Mediated Resonance and Quantum Size Effects", by F. Mache et al., J. Opt. Soc. Am. B., vol. 3, No. 12, pp. 1647–1655, Dec. 1986.

*Primary Examiner*—Willaim Mintel
*Assistant Examiner*—R. Potter
*Attorney, Agent, or Firm*—Freddie M. Bush; Hay Kyung Chang

[57] ABSTRACT

A block of composite material includes a dielectric material with a dielectric constant of $\epsilon_d = 4.66$ and which is at least 4 μm thick and has electrically conductive microparticles randomly distributed throughout. The composite material exhibits an optical bistability without cavity feedback. The microparticles must be nearly uniform in size and of spherical diameter much smaller than the wavelength of light in the particle. The composite, when illuminated by laser light in the range of 500 nm and of varying intensity, becomes opaque at a critical input intensity and stays opaque until the input intensity reaches a certain level both below and above the intensity at which it initially became opaque. Thus the material behaves as an optical switch and a limiter.

1 Claim, 1 Drawing Sheet

FAST OPTICAL SWITCH AND LIMITER USING QUANTUM SIZE EFFECT IN METAL GRAIN COMPOSITES

DEDICATORY CLAUSE

The invention described herein was made in the course of or under a contract or subcontract thereunder with the Government and may be manufactured, used, and licensed by or for the Government for govermental purposes without the payment to us of any royalities thereon.

BACKGROUND OF THE INVENTION

Optical bistability is the phenomenon whereby a system can exist in one of two stable states for a given incident light intensity. This bistable behavior can be utilized for optical switching, optical digital memory elements, and intensity-limiting behavior, as well as transistor action (the optical counterpart of the electronic transistor). Such devices can be incorporated in all-optical communication systems, data processing systems, and logic operations in an all-optical digital computer.

It has been shown that optical bistability without an optical cavity can occur in a transparent dielectric material which has conducting microparticles randomly and independently distributed throughout it. This is taught by D.S. Chemla and D.A.B.. Miller in an article titled "Mechanism for Enhanced Optical Nonlinearities and Bistability by Combined Dielectricelectronic Confinement in Semiconductor Microcrystallites" published in Optics Letters, Vol 11, No. 8, August 1986, p. 522. This bistability in the material is intrinsic since it does not require the use of an external cavity or other forms of optical feedback.

SUMMARY OF THE INVENTION

A block of transparent dielectric material with certain required parameters acts as an optical switch when used with a laser light source of variable intensity emitting laser light at a wavelength around 500 nanometers (nm). The required parameters are that the block of dielectric material be at least 4 micrometers ($\mu$m) thick and have conducting microparticles of about 5 nm in radius randomly distributed throughout it with a vloume fraction of $10^{-3}$ (ratio of particle volume to host volume). A candidate for such a dielectric material is silica glass embedded with silver microparticles, meeting the above criteria.

DESCRIPTION OF THE PREFERRED EMBODIMENT

Figure 1:
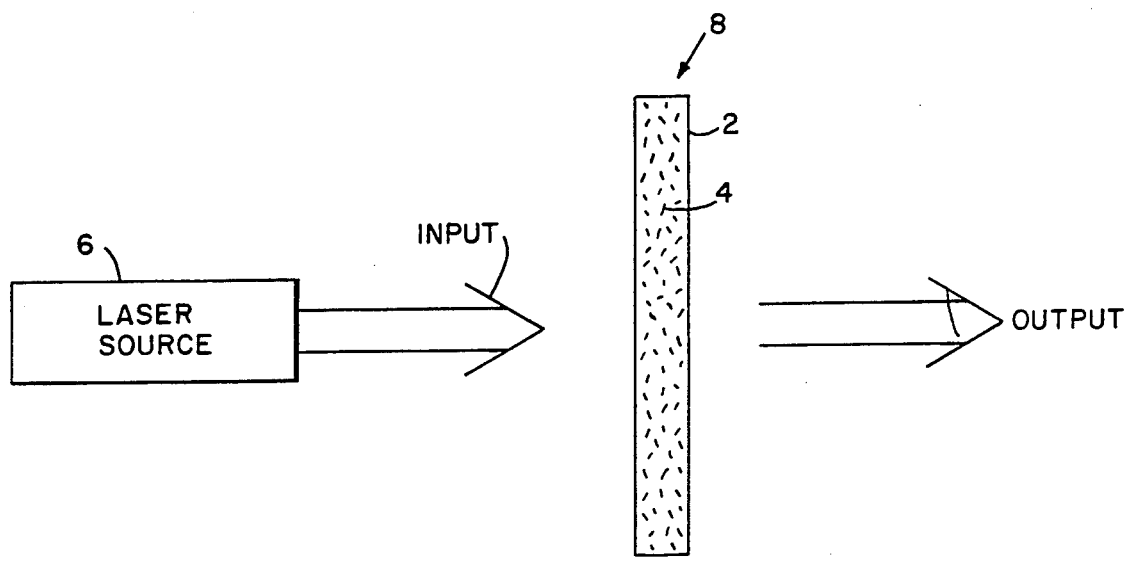
FIG. 1 shows a preferred embodiment of the invention.

Referring now to the drawings wherein like numbers refer to like parts, FIG. 1 discloses the preferred embodiment of the invention. A block of silica glass 2 is placed in a position to receive a laser beam of wavelength around 500 nm of varying intensity from a laser source 6. Silica glass 2, which may be replaced by any transparent dielectric material for the purpose of this invention, is at least 4$\mu$ m thick and is embedded with spherical conducting microparticles 4. The microparticles are sufficiently small that the optical electromagnetic field is nearly constant inside a given particle and causes effects accordingly when the particle diameter is much less than a wavelength of the electromagnetic field in the material. The size condition is necessary to produce the characteristics of the device presented here. These conducting particles are of silver and nearly uniform in size with sizes about 5 nm in radius. Particles 4 are randomly distributed throughout silica glass 2 with a vloume fraction of $10^{-3}$. When laser light from source 6 is incident on the composite dielectric material 8, composite remains transparent until the intensity of the input beam reaches a critical level, at which point composite material 8 becomes opaque, significantly limiting output intensity.

Figure 2:
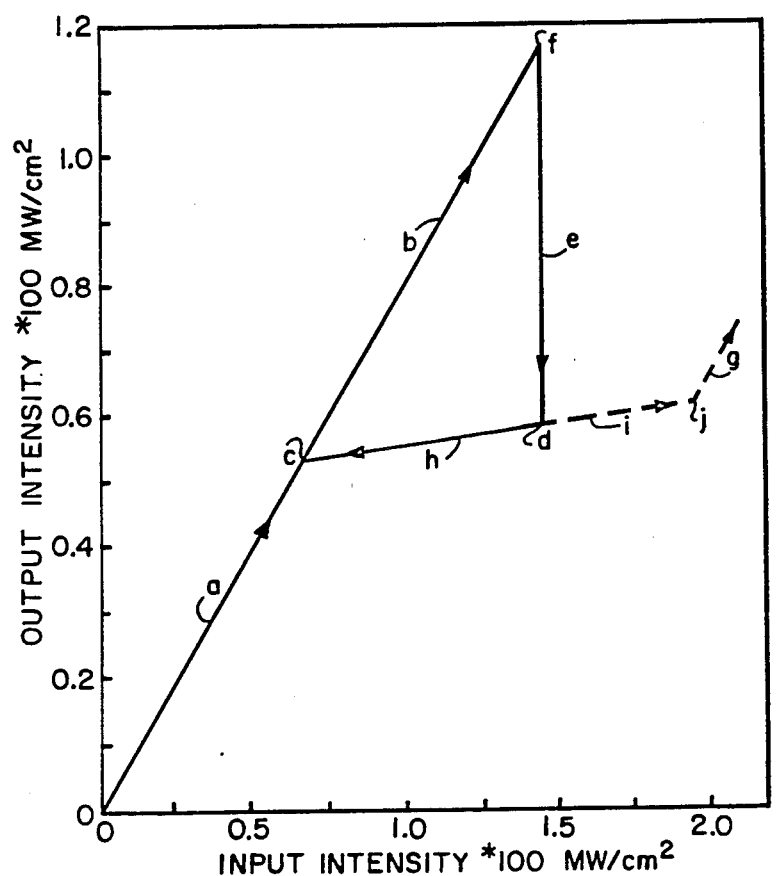
FIG. 2 is a graphic depiction of the character of the doped silica glass that enables it to function as an optical switch.

This phenomenon is graphically illustrated by FIG. 2. In FIG. 2, it is seen that as the input intensity rises, the output intensity also rises correspondingly as depicted by segments a and b. However, when input intensity reaches about 150 MW/cm$^2$, there is a sudden drop in output intensity from slighty under 120 MW/cm$^2$ (point f) to slightly under 60 MW/cm$^2$ (point d). At input intensity of about 150 MW/cm$^2$ where the precipitous drop in output intensity occurred (fd), if the input intensity now decreases, the output intensity will also decrease but an insignificant degree as shown by segment h until the input intensity decreases to about 60 MW/cm$^2$ (point c). At this juncture, the output intensity decreases along segment a or increases along segment b as input intensity varies. At point d, if input intensity continues to increase instead of decreasing, output intensity changes insignificantly along segment i until it reaches point j where output intensity begins to rise linearly along with the rise in input intensity as indicated by segment g.

The input-output intensity characteristic shown in FIG. 2 is unique as an optically bistable device in that once the device has switched off at threshold (point f), the return remains low, i.e. off, until the input intensity is again reduced to the threshold point c. Thus, the path of interest or hysteris path of interest follows paths b, e, and h between points c, f, and d.

In operation, impinging laser light can be passed as long as the intensity is less than 150 MW/cm$^2$. At point f limiting action takes place. Any increase in input intensity along path i (from point d to point j) results in reduced output. Similarly, a decrease in intensity along path h produces reduced output and the switch is "off". Decreasing to point c, approximately 60 MW/cm$^2$, the output intensity starts to follow the initial path - path a or path b as previously noted. At this time the switch is now again "on". Thus the switch is "on" from 0 to approximately 150 MW/cm$^2$ of intensity input, switches "off" and remains "off" until the input intensity falls to approximately 60 MW/cm$^2$ input.

Thus, as shown in FIG. 2, two stable states are provided by composite 8 for a given input or incident light intensity. Point c is a lower threshold and point f is an upper threshold. Once increasing input light intensity exceeds threshold at point f a different stable state is entered and intensity must return to a level equal to or below threshold point c to re-enter the other stable state. This allows fast switching to occur and precise limiting of input intensity in a system.

The intensity switching threshold for the material parameters addressed here is 150 MW/cm$^2$ with switching times on the order of 1 picosecond within a range of a factor of 2. By adjusting the composite density, this threshold can be controlled or varied within a factor of ten, with the wavelength still in the visible. The wavelength for reasonance can also be adjusted over a range of 100 nm by adjusting the host dieletric constant (i.e. changing the transparent host material). Other materials for the microspheres, such as platinum, and conducting polymers such as polydiacetylene will give similar, but different characteristics. A typical laser source is a Quantel 1.06 $\mu$ m frequency double YAG laser operating at 532 nm with 30 picosecond pulses at 2 millijoule per pulse. The mathematical principles that describe the results depicted by FIGS. 1 and 2 are as follows: In the quasistatic approximation (i.e. the size of microsphere is much smaller than the wavelength used, here 500 nm), the electric field $E_L$ inside such a spherical grain is given by $$E_L = \frac{3\epsilon_d}{2\epsilon_d + \epsilon_m(E_L)} E_o \quad (1)$$

where
$\epsilon_d$ = dielectric constant of the host material
$\epsilon_m (E_L)$ = dielectric constant of the metal grain and
$E_o$ = applied external field.

The nonlinear part of the dielectric constant of the metal grain is chosen to be the form, $$\epsilon_m(E_L) = \chi_3 I_L + \epsilon_o \quad (2)$$

where $\epsilon_o$ is the linear part,
$I_L = |E_L|^2$ is the local intensity and $\chi_3$ is the third order nonlinear susceptibility. It is well established that the solution for $E_L$ vs. $E_o$ from Equation (1) can be multivalued.

Now, the case of material which is composed of microscopic particles that are randomly distributed throughout the medium with a given volume fraction is considered. The medium can be described by an effective dielectric constant $\epsilon^*$. For small volume fraction f, $\epsilon^*$ can be approximated by the well-known Maxwell-Garnett approximation, $$\epsilon^* = \epsilon_d + f\left[\frac{3\epsilon_d}{(2\epsilon_d) + \epsilon_m}\right](\epsilon_m - \epsilon_d) \quad (3)$$

Using this $\epsilon^*$, the Maxwell equations have been numerically solved, neglecting the transverse effects.

To obtain the results depicted in FIGS. 1 and 2, the following quantities are used.

$$\epsilon_o = \epsilon_\infty + \frac{\omega_p^2}{\Omega^2 - \omega^2 - i\omega\Gamma}$$

where,
$\epsilon_\infty = 4.66$
$\Omega = (5/3)^{\frac{1}{2}}(V_F/a)$
$\Gamma = \Gamma_b + (V_F/a)$
a is the size of the microparticle,
$\omega$ is a frequency of incident laser radiation,
$\omega_p$ is the plasma frequency,
$V_F$ is the Fermi velocity,
$\Omega$ is the resonance frequency of the linear dielectric function due to particle size effects,
$\Gamma$ is the damping coefficient, and
$\Gamma_b$ is the damping coefficient of the bulk material.

For the case of silver microparticles, the following values for $V_F$, $\Gamma b$ and $\omega_p$ are used:
$V_F = 1.29 \times 10^8$ cm/sec.
$\Gamma_b = 2.5 \times 10^{13}$ /sec.
$\omega_p = 4.0 \times 10^{31}$ /sec.

In summary, dielectric material with the required parameters, such as silica glass at least 4 82mm thick and doped with silver microparticles of size of about 5 nm, when working in conjunction with a laser source emitting a laser beam in the range of 500 nm and of variable intensity, functions as an optical switch and limiter, exhibiting optical bistability without requiring cavity feedback.

Although the present invention has been described with reference to a preferred embodiment, workers skilled in the art will recongnize that changes may be made in the form and detail without departing from the scope and spirit of foregoing disclosure. Accordinly, the scope of the invention should be limited only by the claims appended hereto.

We claim:

1. An optical switch and limiter for controlling the transmittance therethrough of laser radiation of wavelength of about 500 nanometers incident thereon, the transmittance being dependent on the level of intensity of the incident radiation, said switch and limiter comprising: a block of optically bistable dielectric host material, host material being of silica glass and at least 4 microcmeters thick and further positioned to receive the variable intensity radiation from a suitable laser source and having randomly distributed therein silver particles of about 5 nanometers in radius, the distribution of said particles being in accordance with a ratio of particle volume to host material volume of approximately $10^{-3}$.

* * * * *